US005630441A

United States Patent [19]

Feldman

[11] Patent Number: 5,630,441

[45] Date of Patent: May 20, 1997

[54] SELF-CLOSING LIQUID/GAS CONTROL VALVE

[75] Inventor: Joseph Feldman, Tel-Aviv, Israel

[73] Assignee: Selector, Ltd., Petach Tikua, Israel

[21] Appl. No.: 615,601

[22] Filed: Mar. 13, 1996

[30] Foreign Application Priority Data

Mar. 29, 1995 [IL] Israel ........................................ 113180

[51] Int. Cl.[6] ........................................ F16K 17/42

[52] U.S. Cl. ........................ 137/183; 137/212; 137/614.21

[58] Field of Search .................................... 137/183, 212, 137/614.21

[56] References Cited

U.S. PATENT DOCUMENTS 3,018,023 1/1962 Talarico ............................ 137/183 X

*Primary Examiner*—Gerald A. Michalsky
*Attorney, Agent, or Firm*—Sol Sheinbein

[57] ABSTRACT

A self-closing control valve for stopping the penetration of propellant gas into a liquid dispensing system, upon the exhaustion of the liquid from its supply vessel. The valve is easily assembled into standard beer barrels or syrup vessels of $CO_2$ gas propelled beverages dispensing installations.

6 Claims, 4 Drawing Sheets

SELF-CLOSING LIQUID/GAS CONTROL VALVE

BACKGROUND OF THE INVENTION

The present invention generally relates to valves, and particularly to valves for interrupting the flow of a liquid under the pressure of a propulsion gas.

The invention is particularly useful in the context of pre-mix soft drinks dispensing installations, as will be now briefly described with reference to FIG. 1.

Hence, a typical dispensing installation comprises a series of dispensing spigots A1, A2, A3 for the different kinds of beverages—beer and carbonated drinks in the present example.

The supply of the beer and of the soft drink syrups to a refrigerator (and/or carbonated water mixing unit) B is achieved in the following manner.

A vessel C containing beer, and one or more vessels D containing syrup(s) are available and connected to the refrigerator as shown. The vessels are also connected to a supply source of pressurized $CO_2$—cylinder E. The $CO_2$ gas is admitted into the vessels C and D, above the level of the liquid, which is thus forced to flow up, each through a siphon tube F extending within the vessel. The $CO_2$ gas only serves as a propellant for the liquid contents of the vessel.

It will be now readily understood that once the level of the liquid lowers down to the (open) bottom of the siphon tube, gas will penetrate the installation and become supplied to the spigots A—rather than the desired liquid. This also signs the need to replace the exhausted vessel.

Upon replacement, an operation of gas evacuation from the system is required before ordinary, quality drink serving is resumed. This operation is annoying and time consuming.

It goes without saying that the stop valve herein proposed is useful for several other applications, for example in forced fuel supply systems where a similar problem is encountered.

It is thus the object of the invention to overcome the above described deficiency, namely to avoid the penetration of a propellant gas into a liquid supply system when the liquid is exhausted.

It is a further object of the invention to provide a valve which is readily installable into the existing beer or soft drinks syrup vessels standard connectors, namely without need to install a special, external or internal, device.

SUMMARY OF THE INVENTION

Thus, according to the invention there is provided, for interrupting the flow of a liquid under the propulsion of pressurized gas, a self-closing valve comprising: a housing with an inlet port at one side, an outlet port at the other side of the housing and an intermediate, hollow space extending therebetween. A first valve seat is formed at the inlet port side of the intermediate space and a second valve seat is formed at the outlet port side of the intermediate space. A first, elongated freely slidable valve member is provided, placed within the space, comprising a portion configured to close against said first valve seat, a blind bore open at the outlet port side and extending in register therewith, and a second, freely movable valve member is placed within the bore, configured to close against the second valve seat. An orifice communicates the bore with the space upstream of the first valve seat. The arrangement is such that during supply of the liquid through the inlet, the first valve member becomes lifted to allow the flow of the liquid through the first valve seat, around the first valve member and through the said outlet, and upon the pressurized gas reaching the level of the orifice, the second valve member becomes seated against the second valve seat to close the outlet port.

BRIEF DESCRIPTION OF THE DRAWINGS

These and additional constructional features and advantages of the invention will be come readily understood in the light of the following description of a preferred embodiment thereof, given by way of example only, with reference to the accompanying drawings, wherein.

DETAILED DESCRIPTION OF THE PREFERRED EMBODIMENT

Figures 2A, 2B, 2C:
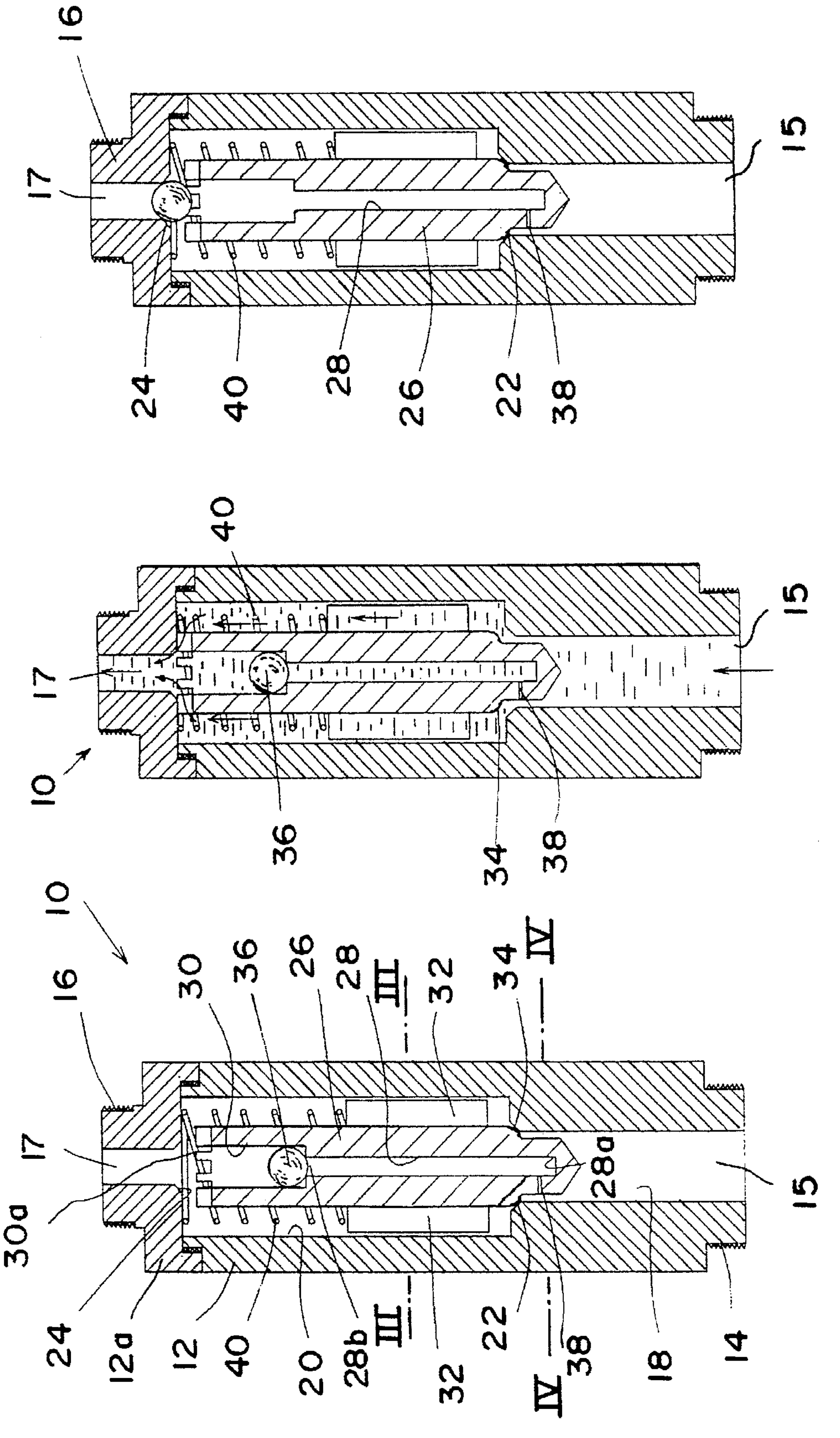
FIG. 2*a* is an axial cross-section of the self-closing valve featuring the principles of the present invention, in its non-operative position.
FIG. 2*b* shows the valve of the FIG. 2*a* in its operative, liquid supplying position.
FIG. 2*c* shows the valve of the FIG. 2*a* in its gas stopping position.
Figure 4:
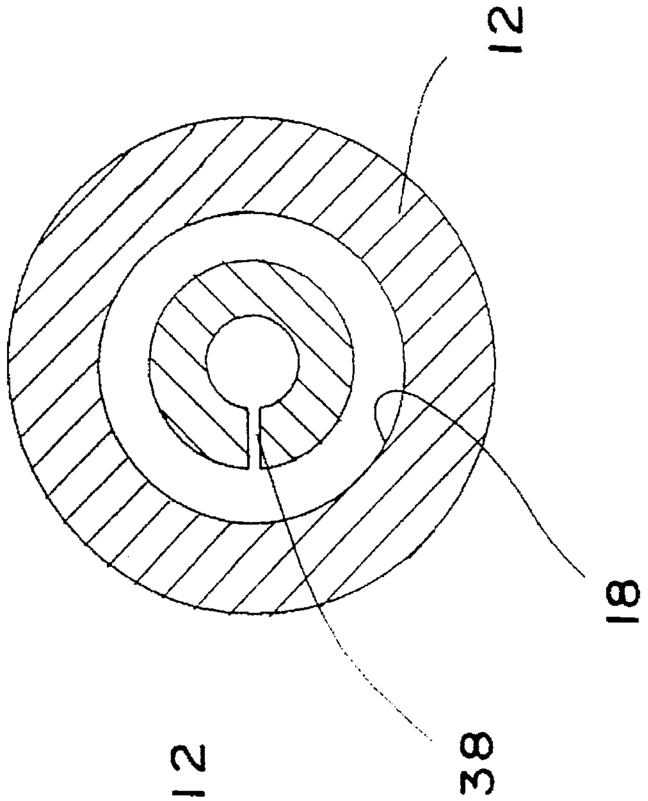
FIG. 4 is a section taken along line IV—IV of FIG. 2*a*.
Figure 3:
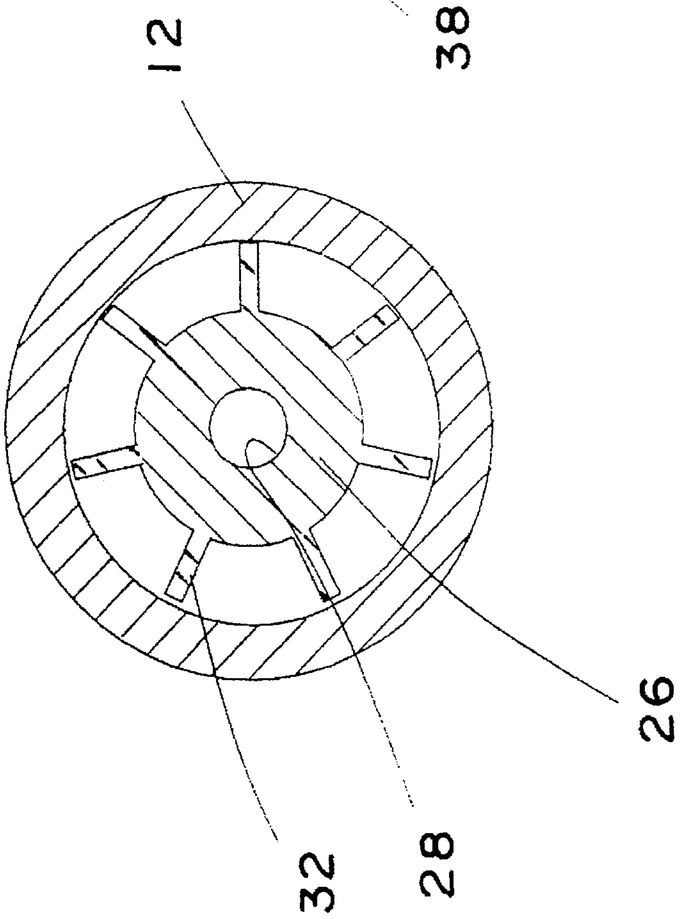
FIG. 3 is a section taken along line III—III of FIG. 2*a;*

Referring to FIG. 2*a*, the proposed stop valve attachment member, generally denoted 10, comprises a housing 12 with a cap closure 12*a*, having an inlet mounting flange 14 with inlet port 15, and outlet attachment flange 16 with outlet 17. The housing has a thoroughgoing bore having a first, smaller diameter portion 18, and an enlarged diameter portion 20, with a first valve seat 22. A second valve seat 24 is formed in the closure 12*a*. Within the enlarged diameter portion 20 there is freely seated a first valve member denoted 26. The member 26 is elongated, formed with a blind bore 28, closed at its bottom side 28*a* and open at its upper side 28*b*, where it extends into a larger diameter bore portion 30. The opening of bore 30 is formed with a series of comb-like projections 30*a*—rather than having a smooth rim.

The outer side of the valve member 26 is provided with fins or ribs 32 for centering the member within the bore portion 20; and with a valve portion 34 adapted to fit against the first valve seat 22.

Within the bore 30, a second valve member in the form of a sphere 36 is freely seated. The valve member 36 may be a steel bearing ball, or of any other material. The second valve seat 24 is configured to become sealed against the second valve member 36 when it reaches the position of FIG. 2*c*.

A small opening or orifice 38 is provided at the bottom of the member 26, which communicates the bore portion 18 with the bore 28. As shown, the level of the orifice 38 is well below that of the valve seat 22.

Finally, a weak coil spring 40 is provided, constantly pressing the first valve member 26 against the first valve seat 22.

The operation of the valve 10 will now be described. Let us assumed that the inlet flange 14 is attached to a gas propelled liquid supply source. Once the flow of the liquid starts, by opening the liquid supply installation control valve connected to the outlet flange 16 (not shown), the flow of the liquid under the gas pressure will cause the lifting of the member 26, thus opening the first valve seat 22 against the force of the spring 40. The liquid will freely flow as shown by the arrows in FIG. 2*b* out of the system through the outlet 17. The liquid may also enter through the orifice 38 into the bore 28, but a substantial pressure drop thereof will occur and the main supply path will be maintained as above described, namely around the valve member 26.

Referring now to FIG. 2*c*, once the liquid is exhausted and the gas under pressure reaches the level of the orifice 38, the liquid accumulated within the bore 28 will flush upwards and shoot the ball 36 against the second valve seat 24. Simultaneously, the valve member 26 will drop down to close the valve seat 22. Therefore, gas will be stopped from reaching the outlet 17 and the flow of both the liquid and the gas will be abruptly discontinued until the supply of pure liquid will be re-instituted.

Figure 5:
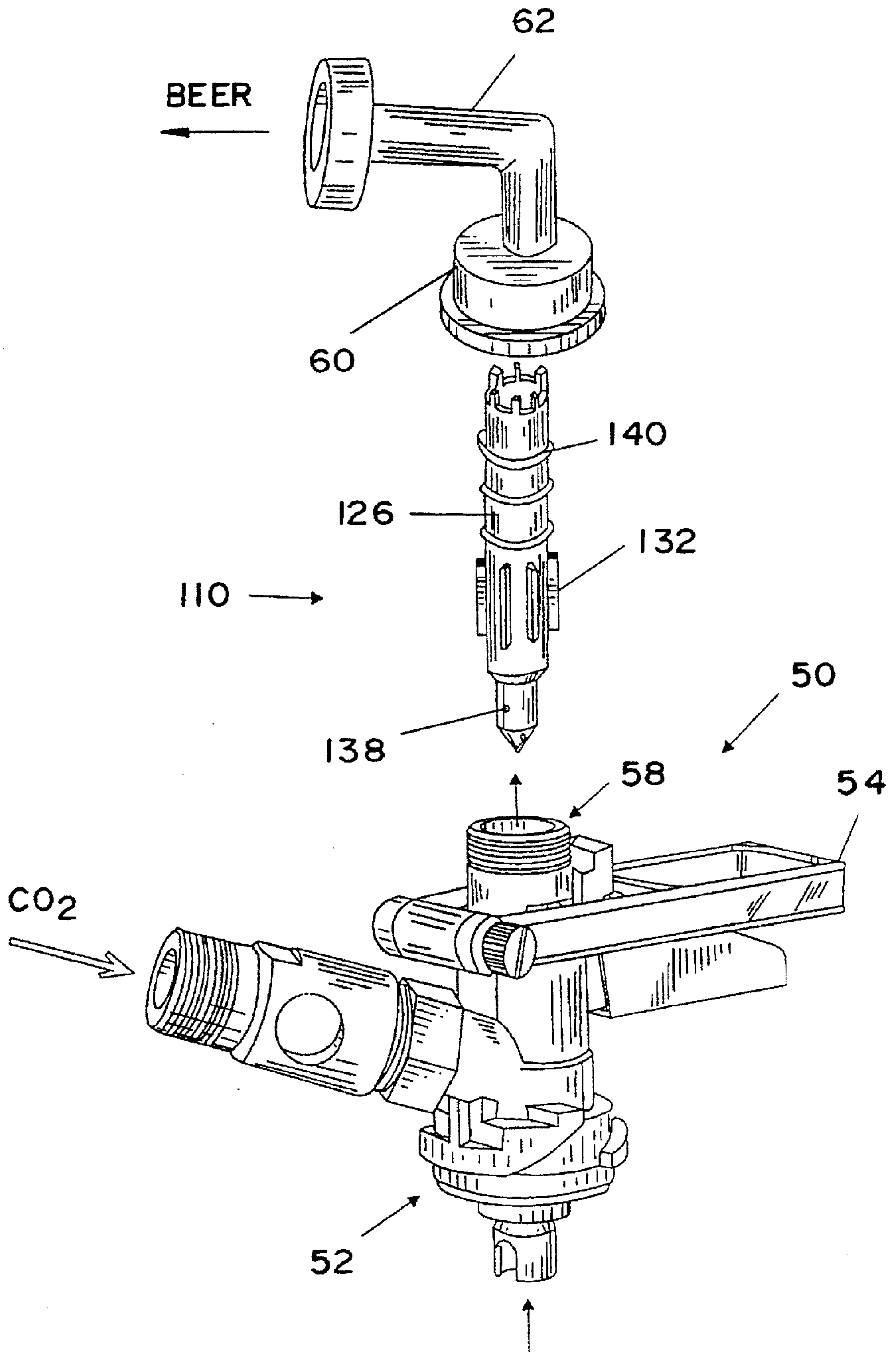
FIG. 5 is an exploded view of a standard beer vessel connector valve provided with the stop valve attachment according to a preferred embodiment of the invention.

As already mentioned, an advantageous utilization of the valve according the invention is in beverage installations, namely beer supply vessels or syrup supply vessels. In FIG. 5 there is shown a typical, standard beer vessels connector valve, denoted 50 (see also FIG. 1), comprising a beer vessel mounting portion 52, an operating handle 54, a $CO_2$ supply inlet fitting 56 and beer outlet fitting 58.

Figure 1:
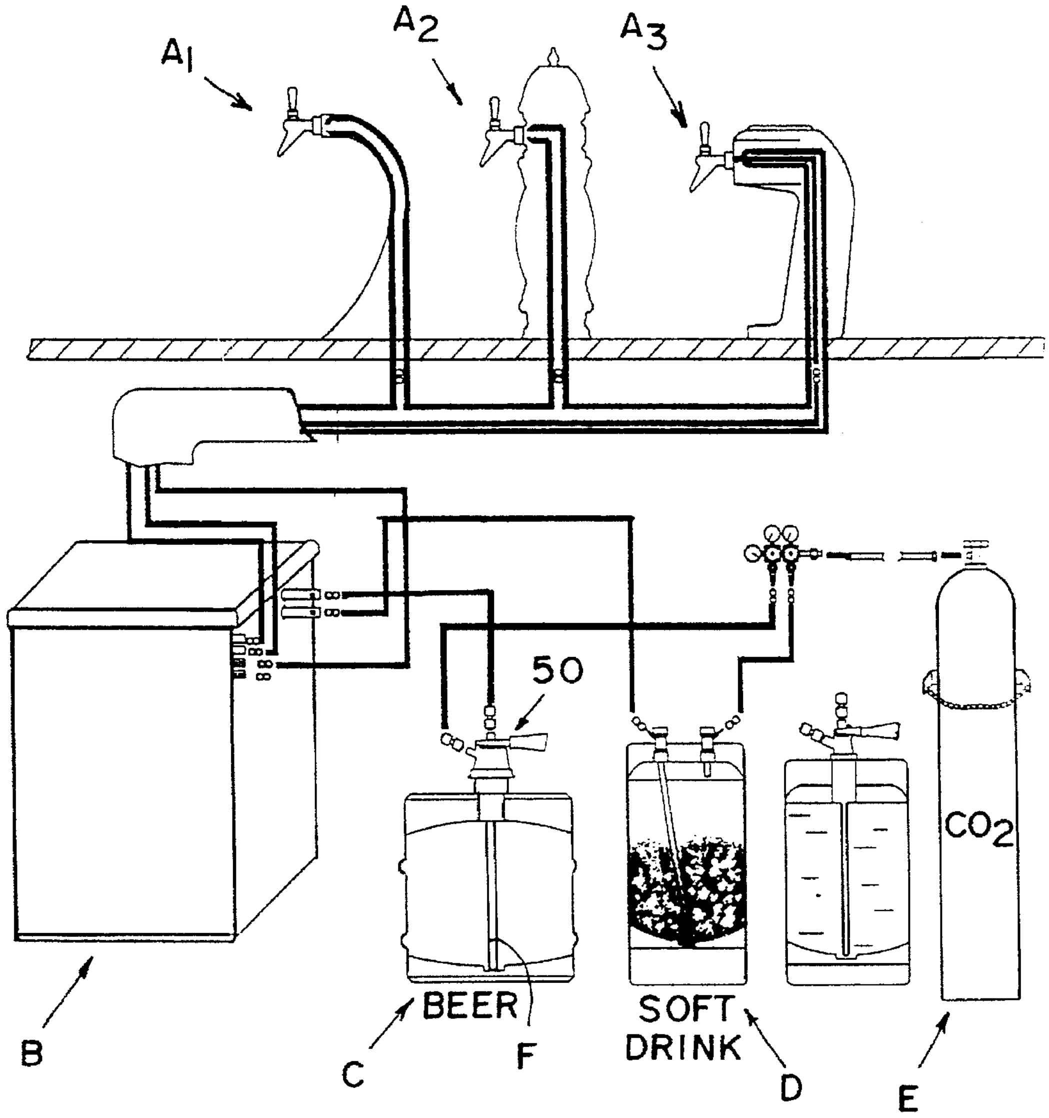
FIG. 1 is a schematic representation of a typical soft drinks dispensing installation.

As schematically shown, the stop valve member 110 is readily insertable into the (existing) hollow of the outlet fitting portion 58 of the valve 50, with the coil spring 140 already dressed over it, and closed by a cap 60 of outlet tube 62 leading to the beverage supply installation (see FIG. 1). Thus, the standard connector 50 can easily be converted into a liquid/gas self-closing device without changing of the system whatsoever.

The conversion of a standard syrup outlet fitting (see FIG. 1) into a gas responsive stop-valve is attained in a similar manner, and the protection of the installation against the undesirable gas penetration into its various parts is effectively and conveniently prevented.

Those skilled in the art will readily understand that various changes, modifications and variations may be applied to the invention as above exemplified without departing from the scope of the invention as defined in and by the appended claims. Thus for example, the stop valve can operate also in a horizontal position if the ball 36 is installed with a counter spring, replacing the gravity induced displacement thereof.

What is claimed is:

1. For interrupting the flow of a liquid under the propulsion of pressurized gas, a self closing valve comprising:

a housing;

an inlet port at one side, an outlet port at the other side of the housing and a hollow space extending therebetween;

a first valve seat formed at said inlet port side of the said space;

a second valve seat formed at said outlet port side of the space;

a first, elongated freely slidable valve member placed within said space, comprising:

a portion configured to close against said first valve seat;

a blind bore, open at the outlet port side and extending in register therewith;

a second, freely movable valve member placed within said bore, configured to close against the second valve seat; and an orifice communicating said bore with said space upstream of said first valve seat;

the arrangement being such that during supply of the liquid through said inlet, the first valve member becomes displaced to allow the flow of the liquid through the first valve seat, around the first valve member and through said outlet, and upon the gas reaching the level of said orifice, the said second valve member becomes seated against said second valve seat to close said outlet.

2. The self-closing valve as claimed in claim 1, wherein said second valve member is spherical.

3. The self-closing valve as claimed in claim 2, wherein said second valve member is made of metal.

4. The self-closing valve as claimed in claim 3, wherein said first valve member is spring loaded in the direction of said first valve seat.

5. The self-closing valve as claimed in claim 1 comprised in a standard beer supply vessel connector valve.

6. The self-closing valve as claimed in claim 1 comprised in a standard soft-drink syrup supply vessel connector valve.

* * * * *